United States Patent [19]

Kearney

[11] Patent Number: 4,646,441
[45] Date of Patent: Mar. 3, 1987

[54] DIAL INDICATOR ADAPTER

[76] Inventor: Calvin T. Kearney, 3150 Vista Del Mar, Glendale, Calif. 91208

[21] Appl. No.: 822,472

[22] Filed: Jan. 27, 1986

[51] Int. Cl.$^4$ ............................................. G01B 5/25
[52] U.S. Cl. ................................ 33/172 D; 33/169 C; 33/181 R
[58] Field of Search ............ 33/169 C, 172 R, 172 B, 33/172 C, 173, 180 R, 181 R; 248/124, 122, DIG. 4

[56] References Cited

U.S. PATENT DOCUMENTS

| | | | |
|---|---|---|---|
| 2,571,853 | 10/1951 | Fontecchio | 33/172 B X |
| 3,507,047 | 4/1970 | Stadele | 33/172 D |
| 3,542,323 | 11/1970 | Arnold | 33/172 D X |
| 4,208,157 | 6/1980 | Guarino et al. | 33/172 D X |
| 4,299,370 | 11/1981 | Monticelli et al. | 248/DIG. 4 X |

Primary Examiner—Harry N. Haroian
Attorney, Agent, or Firm—James E. Brunton

[57] ABSTRACT

An adapter, or holder, for detachably mounting a dial indicator on a spindle such as may be found on milling machines and other machine tools. The design of the adapter is such that the dial indicator can be freely rotated to the workpiece without the necessity of rotating the spindle.

10 Claims, 3 Drawing Figures

DIAL INDICATOR ADAPTER

BACKGROUND OF THE INVENTION

1. Field of the Invention

The present invention relates to an adapter, or holder, for detachably mounting a dial indicator on a spindle such as may be found on milling machines and other machine tools. More particularly, the invention concerns an adapter which permits rotation of the dial indicator relative to the workpiece without the necessity of rotating the spindle.

2. Discussion of the Prior Art

It is a well known practice to mount a dial indicator on the spindle of a milling machine or on the headstock of a lathe to measure concentricity or position of a workpiece with respect to the axis of rotation of the mill or lathe.

Various types of adapters or holders have been suggested to enable interconnection of dial indicators with the spindles of machine tools. Certain of the prior are adapters are concerned primarily with improved mechanisms for attaching the dial indicator to the spindle. The patent to Arnold U.S. Pat. No. 3,542,323 is exemplary of such art.

Other prior art holders are directed to providing mechanisms for radical displacement of the feeler elements with respect to the axis of rotation of the spindle. The patent to Muller U.S. Pat. No. 3,601,997 discloses such a device.

Still other prior art holders are primarily concerned with providing mechanisms which permit pivotal or swinging movement of the holder elements with respect to the workpiece. Such devices are shown in the patents to Lock U.S. Pat. No. 4,439,925 and to Steineman U.S. Pat. No. 3,167,866.

Common to all of the prior art holders, or adapters, is the requirement that the spindle of the machine be rotated as the dial indicator measurements are made. Because of the difficulty in rotating the spindle by hand, as is the case in many types of large machines, this requirement is highly undesirable. Further, rotation of the spindle, either by hand or by actuation of the motor, can be quite dangerous.

The aforementioned drawback of the prior art devices is uniquely overcome by the present invention. Due to the novel design of the adapter of the present invention, the dial indicator can readily be attached to the spindle and can then be effortlessly rotated relative to the workpiece by hand while the spindle remains absolutely stationary.

SUMMARY OF THE INVENTION

It is an object of the present invention to provide an adapter for detachably mounting a dial indicator device on the spindle of a machine tool in which the adapter can easily and quickly be interconnected with the spindle so that the feeler tip of the dial indicator is precisely aligned with the axis of rotation of the spindle.

It is another object of the invention to provide the adapter of the aforementioned character having a first portion which is mounted on the spindle and a second portion which carries the dial indicator device, the second position being precisely rotatable relative to the first portion about the axis of rotation of the spindle.

A further object of the invention is to provide an adapter described in the preceding paragraphs in which the dial indicator device can be easily attached and detached and can be locked securely in place within the second portion of the adapter.

Still another object of the invention is to provide an adapter of the character described which is of simple construction; is highly durable and reliable in continuous use and which can be inexpensively produced in high volume.

DESCRIPTION OF THE INVENTION

Figure 1:
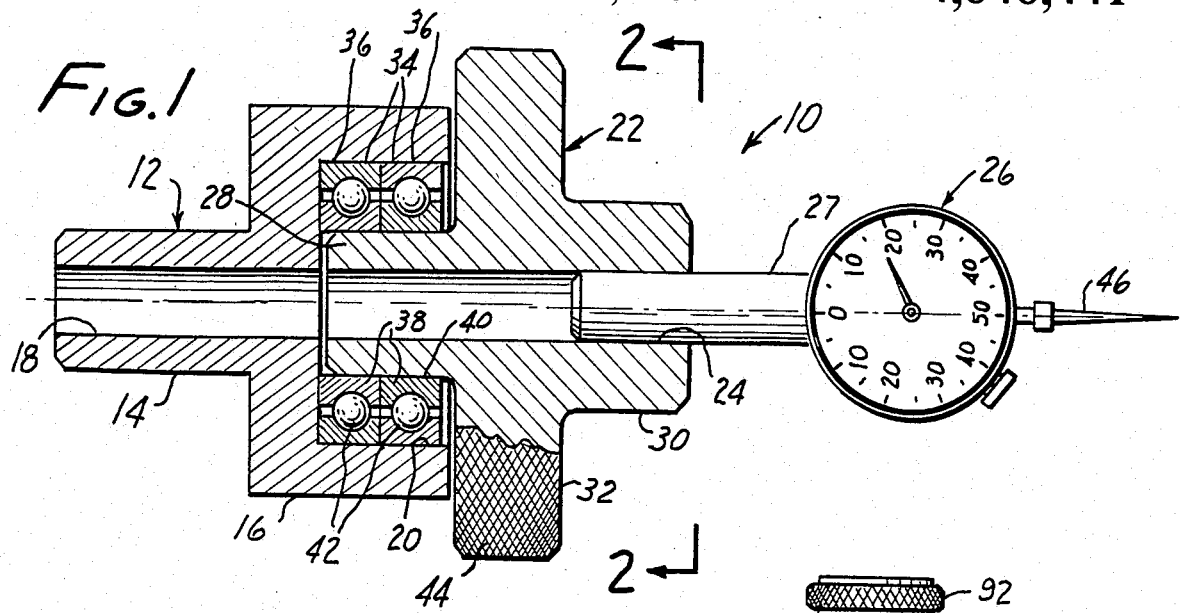
FIG. 1 is a side elevational view, partly in crosssection, showing the dial indicator adapter of the present invention.
Figure 2:
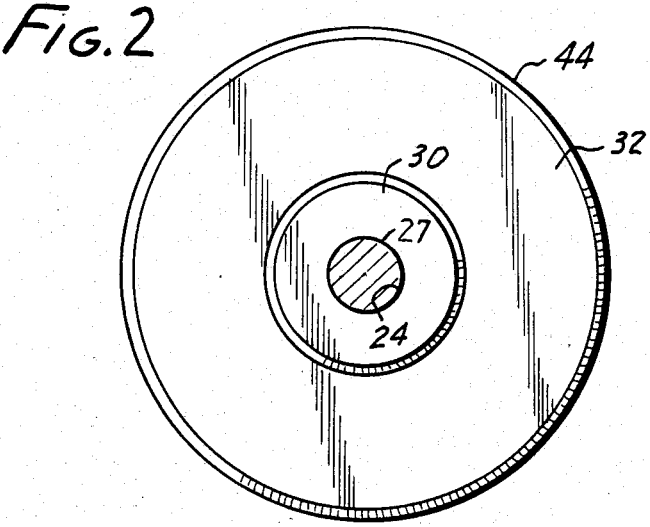
FIG. 2 is a view taken along lines 2—2 of FIG. 1.

Referring to the drawings and particularly to FIGS. 1 and 2, the adapter for mounting a dial indicator on the spindle of a machine tool is generally indicated by the numeral 10. In the form of the invention shown in FIGS. 1 and 2, the adapter comprises a first member 12 having a reduced diameter portion 14 and an enlarged diameter portion 16. First member 12 has an axially extending first bore 18 formed within portion 14 which is adapted to telescopically receive the spindle of the machine tool and a second enlarged diameter axially extending second bore 20 formed within enlarged diameter portion 16.

Operably associated with first member 12 is a second member 22 having attachment means comprising an axially extending bore 24 adapted to telescopically receive the shank portion of a standard dial indicator 26. Second member 22 is provided with a reduced diameter portion 28, a slightly larger diameter portion 30 and a greatly enlarged diameter flange portion 32 disposed intermediate portions 28 and 30.

Carried within the second bore 20 of first member 12 are bearing means for rotatably interconnecting the first and second members so that when the dial indicator device 26 is connected to the second member 22, the shank portion 27 thereof can be rotated about the axis of rotation of the spindle of the machine tool while the spindle remains stationary. In the embodiment of the invention shown in FIG. 1, the bearing means comprises a duplex ball bearing having outer races 34 defining surfaces 36 which are closely receivable within second bore 20 of first member 12. The bearing means further comprises inner races 38 defining inner surfaces 40 adapted to closely receive reduced diameter portion 28 of second member 22. As best seen in FIG. 1, inner and outer races 36 and 38 are separated by two rows axially spaced of circumferentially spaced caged balls 42. The diameter of the surfaces 40 of inner races 38 are such that portion 28 of member 22 can be press-fit into the bearing means, thereby securely rotatably interconnecting first and second members 12 and 22 respectively.

In operation, with the adapter of the invention configured as indicated in FIG. 1, the spindle of the machine tool is telescopically inserted into axial bore 18. The construction of the adapter is such that the axial centerline of dial indicator 26 will be precisely co-axially aligned with the axis of rotation of the spindle of the machine tool. With the adapter connected to the spindle of the machine tool, the second member 22, along with dial indicator 26, can be easily rotated about the axial centerline of the spindle by grasping the flange portion 32, which has a knurled outer surface 44, and turning it in either a clockwise or counter-clockwise direction thereby controllably rotating the feeler portion 46 of the dial indicator relative to the workpiece. With this arrangement, there is no need for rotating the spindle of the machine tool, either by hand or by energization of the motor of the machine tool thereby avoiding the safety hazards inherent in such operations.

Figure 3:
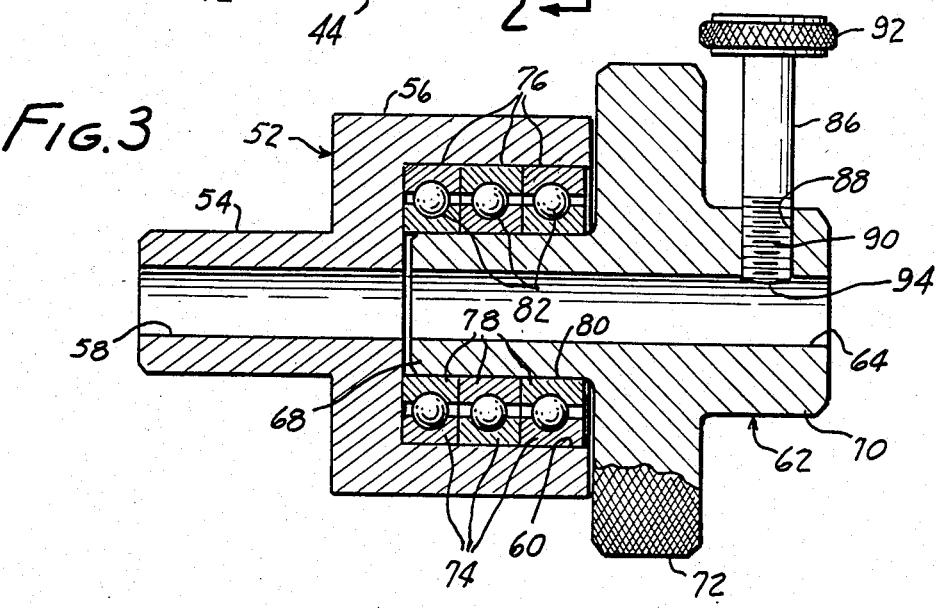
FIG. 3 is a side elevational view, partly in crosssection, showing another embodiment of the dial indicator adapter of the present invention.

Turning to FIG. 3 of the drawings another form of the adapter of the invention thereshown comprises a first member 52 having a reduced diameter portion 54 and an enlarged diameter portion 56. First member 52 has an axially extending first bore 58 formed within portion 54 which is adapted to telescopically receive the spindle of the machine tool and a second enlarged diameter axially extending second bore 60 formed within enlarged diameter portion 56.

Operably associated with first member 52 is a second member 62 having an axially extending bore 64 adapted to telescopically receive the shank portion of a standard dial indicator 26 of the character shown in FIG. 1. Second member 62 is provided with a reduced diameter portion 68, a slightly larger diameter portion 70 and a greatly enlarged diameter flange portion 72 disposed intermediate portions 68 and 70.

Carried within the second bore 60 of first member 52 are bearing means for rotatably interconnecting the first and second members so that when the dial indicator device is connected to the second member 62, the shank portion thereof can be rotated about the axis of rotation of the spindle of the machine tool while the spindle remains stationary. In the embodiment of the invention shown in FIG. 3, the bearing means comprises a triplex ball bearing having outer races 74 defining surface 76 which are closely receivable within second bore 60 of first member 52. The bearing means further comprises inner races 78 defining inner surfaces 80 adapted to closely receive shank portion 68 of second member 62. In this embodiment, inner and outer races 74 and 78 are separated by three axially spaced rows of corcimferentially spaced caged balls 82. The diameter of surfaces 80 of inner races 78 are such that portion 68 of member 62 can be press-fit into the bearing means, thereby securely rotatably interconnecting first and second members 52 and 62 respectively.

An added feature of the adapter of the embodiment of the invention shown in FIG. 3 comprises a locking means for locking the shank portion of the dial indicator securely within the axial bore 64 of the second member 72. In the present form of the invention this locking means comprises a threaded rod 86 adapted to be threadably received within a threaded bore 88 formed within portion 70 of second member 62. Rod 86 includes a threaded shank portion 90 and an enlarged diameter knurled head portion 92. In use, after the shank portion of the dial indicator is telescopically inserted within axial bore 64, rod 86 can be threaded into bore 88 until the extremity 94 of the rod 86 pressurally engages the shank portion of the dial indicator. In this way the shank portion of the dial indicator can be securely positioned within the adapter with the axis thereof in precise axial alignment with the axis of rotation of the spindle of the machine tool.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An adapter for detachably mounting a dial indicator device on a rotatable spindle having a central axis of rotation, said dial indicator device being characterized by having a shank portion, a dial indicator portion and a feeler tip portion, said adapter comprising:
   (a) a first member having an axially extending first bore adapted to telescopically receive said spindle and an enlarged diameter axially extending second bore;
   (b) a second member having an axial bore adapted to telescopically receive the shank portion of the dial indicator; and
   (c) bearing means carried within said second bore of said first member for rotatably interconnecting said first and second members so that when said dial indicator device is connected to said second member said shank portion thereof can be rotated about the axis of rotation of said spindle while said spindle remains stationary.

2. An adapter as defined in claim 1 in which said second member has a reduced diameter portion and in which said bearing means includes an out race defining an outer surface closely receivable within said second bore of said first member and an inner race defining an inner surface adapted to closely receive said reduced diameter portion of said second member.

3. An adapter as defined in claim 1 in which said second member includes locking means for locking said shank portion of said dial indicator within said axial bore of said second member.

4. An adapter for detachably mounting a dial indicator device on a rotatable spindle having a central axis of rotation said dial indicator device being characterized by having a shank portion, a dial indicator portion and a feeler tip portion, said adapter comprising:
   (a) a first member having an axially extending first bore adapted to telescopically receive said spindle and an enlarged diameter axially extending second bore;
   (b) a second member having a reduced diameter portion, an enlarged diameter flange portion and an axial bore adapted to telescopically receive the shank portion of the dial indicator;
   (c) bearing means carried within said second bore of said first member for rotatably interconnecting said first and second members so that when said dial indicator device is connected to said second member said shank portion thereof can be rotated about the axis of rotation of said spindle while said spindle remains stationary, said bearing means comprising an outer race defining a surface closely receivable within said second bore of said first member and an inner race defining an inner surface adapted to closely receive said reduced diameter portion of said second member; and
   (d) locking means for locking said shank portion of said dial indicator within said axial bore of said second member.

5. An adapter as defined in claim 4 in which said bearing means comprises a duplex ball bearing having two axially spaced sets of circumferentially spaced apart caged balls carried between said inner an outer races.

6. An adapter as defined in claim 4 in which second member further includes an outwardly protruding portion having a radially extending threaded bore and in which said locking means comprises a threaded rod adapted to be threadably received within said threaded bore to bring said rod into pressural engagement with the shank portion of the dial indicator.

7. An adapter as defined in claim 6 in which said bearing means comprises a triplex ball bearing having three axially spaced sets of circumferentially spaced apart caged balls carried between said inner and outer races.

8. An adapter for detachably mounting a dial indicator device on a rotatable spindle having a central axis of rotation, said dial indicator device being characterized by having a shank portion, a dial indicator portion and a feeler tip portion, said adapter comprising:

(a) a first member having a first portion adapted to be removably connected to said spindle and an axially extending second portion;
(b) a second member having an axial bore substantially aligned with the central axis of rotation of the spindle adapted to telescopically receive the shank portion of the dial indicator; and
(c) bearing means carried by one of said first or second members for rotatably interconnecting said first and second members so that when said dial indicator device is connected to said second member said shank portion thereof can be rotated about the axis of rotation of said spindle while said spindle remains stationary.

9. An adapter as defined in claim 8 in which said first member has an axially extending first bore adapted to telescopically receive said spindle and in which said bearing means comprises a ball bearing having inner and outer races.

10. An adapter as defined in claim 9 in which said first member has an axially extending first bore and in which said outer race of said ball bearing is closely receivable within said second bore of said first member.

* * * * *